United States Patent [19]

O'Neil et al.

[11] 4,328,413
[45] May 4, 1982

[54] ODOMETER

[76] Inventors: Richard J. O'Neil, 17 Winthrop St., West Boylston, Mass. 01583; Francis P. Dunigan, 134 Lovell St., Holden, Mass. 01520

[21] Appl. No.: 211,676

[22] Filed: Dec. 1, 1980

Related U.S. Application Data

[63] Continuation of Ser. No. 91,572, Nov. 7, 1979, abandoned, which is a continuation of Ser. No. 909,805, May 26, 1978, abandoned.

[51] Int. Cl.³ .................. G06M 3/14; G06F 15/20
[52] U.S. Cl. ..................... 235/92 DN; 235/92 PE; 235/92 EV; 364/561
[58] Field of Search ........ 235/92 DN, 92 PE, 92 NT, 235/95 R, 96, 97; 364/424, 460, 561

[56] References Cited

U.S. PATENT DOCUMENTS

| | | | |
|---|---|---|---|
| 3,708,750 | 1/1973 | Bucks et al. | 235/92 DN |
| 4,068,307 | 1/1978 | Floyd et al. | 235/92 DN |
| 4,074,196 | 2/1978 | Webster | 324/166 |
| 4,084,249 | 4/1978 | Schlick | 364/705 |
| 4,103,332 | 7/1978 | Floyd et al. | 235/92 PE |
| 4,176,397 | 11/1979 | Crom et al. | 235/92 EV |

OTHER PUBLICATIONS

CB Magazine, p. 60, May 1977, "10-20" Digital Continuous Mile Marker Readout.

*Primary Examiner*—Joseph M. Thesz
*Attorney, Agent, or Firm*—Blodgett & Blodgett

[57] ABSTRACT

Odometer having a readout of the light-emitting diode type for showing accurate mileage and having means for introducing a predetermined mileage and selecting an increasing or decreasing mode of operation.

1 Claim, 3 Drawing Figures

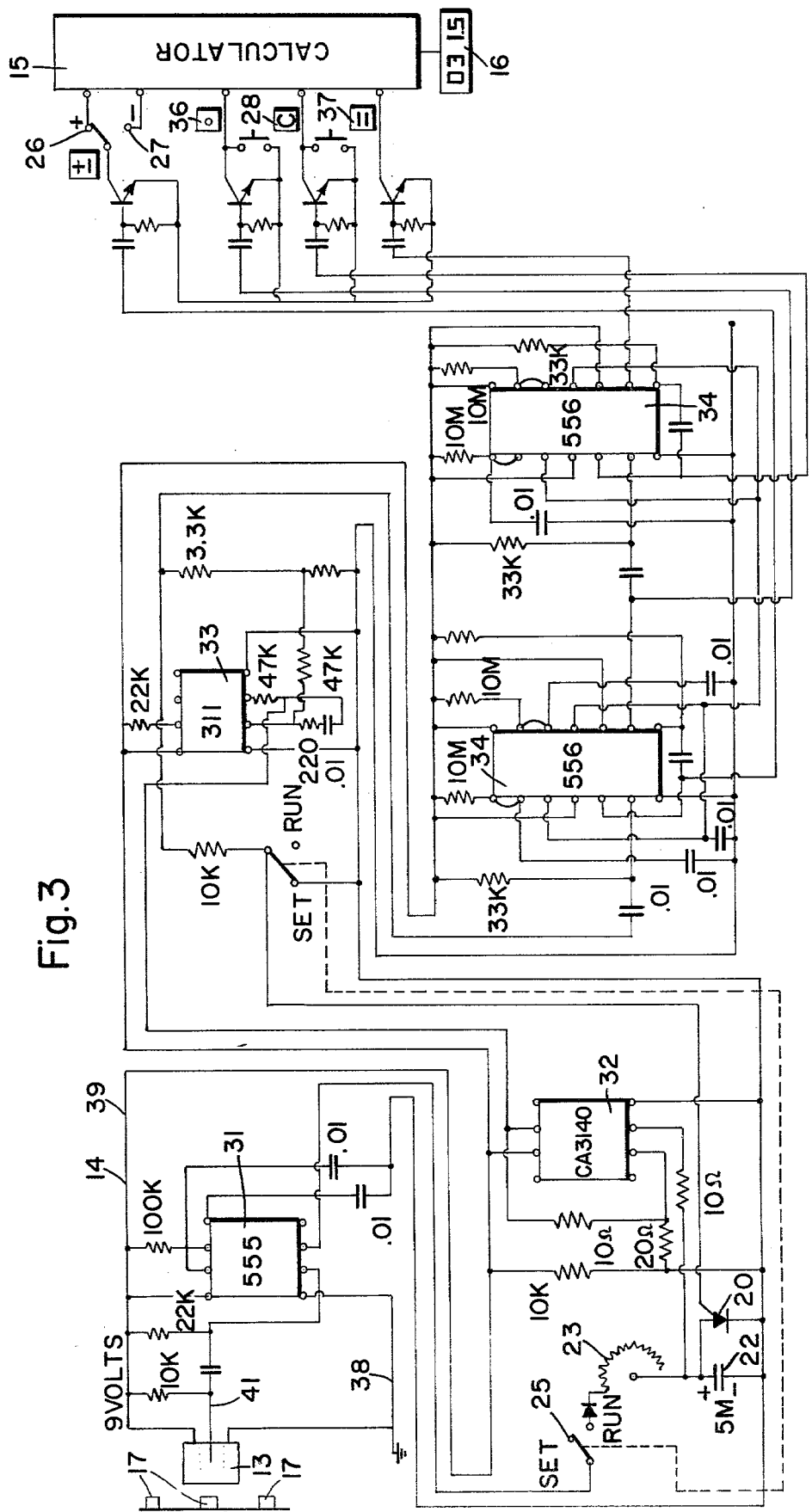

ODOMETER

This is a continuation of application Ser. No. 91,572, filed Nov. 7, 1979, now abandoned, which was a continuation of Ser. No. 909,805, filed May 26, 1978, now abandoned.

BACKGROUND OF THE INVENTION

Among those who travel by automobile or truck extensively, it has become common practice to provide the vehicle with a citizen band (CB) radio receiver and transmitter. This equipment permits relatively easy communication between other vehicles in the area and, particularly on the highway, the CB radio operators forms a "fraternity" of those persons who are always willing to help one another and to warn other vehicles of impending problems on the highway. In this way, other vehicles can be informed of upcoming road problems, such as accidents, flooding, road construction, and the like. Since road hazards are usually related to a certain location on the highway, the warnings are usually related to the mileage markers along the highway, particularly on the high-speed federal highways or state highways. A difficulty that is encountered, however, has to do with the fact that not only is the person who is giving the warning not sure of his mileage position, but the receiving person is not sure of his present position either relative to the hazard. In many cases the mileage marker is obscured by snow or by darkness or has been removed by vandals; even when the markers are clear and available (both at the warning and the receiving end), one of the parties may be located between markers, which appear as mileage markers every mile and as tenths of miles in between. Even though some automobiles are provided with mechanical indicators of total mileage on the automobile, as well as being provided with odometers which can be set at the beginning of a trip, they are quite inaccurate. Secondly, they cannot be "set" quickly. Thirdly, they are incapable of operating in a decreasing mode. Fourthly, they are invariably difficult to read. These and other difficulties experienced with the prior art devices have been obviated in a novel manner by the present invention.

It is, therefore, an outstanding object of the invention to provide an odometer capable of indicating mileage location on a highway to a high degree of accuracy.

Another object of this invention is the provision of an odometer capable of entering mileage quickly and accurately and operating either in the ADDING or the SUBTRACTING mode thereafter.

A further object of the present invention is the provision of an odometer having a readout formed of light-emitting diodes and constructed of solid state elements, including integrated circuits.

It is another object of the instant invention to provide an accurate odometer capable of operating in various modes, which is simple in construction, which is inexpensive to manufacture, and which is capable of a long life of useful service with a minimum of maintenance.

A still further object of the invention is the provision of an odometer, particularly constructed for use in connection with CB communications and permitting the rapid introduction of known mileage marker readings, after which the odometer operates to give a continuous indication of location along the highway.

With these and other objects in view, as will be apparent to those skilled in the art, the invention resides in the combination of parts set forth in the specification and covered by the claims appended hereto.

SUMMARY OF THE INVENTION

In general, the present invention consists of an odometer for use with a vehicle, the odometer having a transducer that generates a first series of electrical pulses indicative of the rate of travel of the vehicle. Control means is provided to which the transducer is connected for the transmission of the series of pulses thereto and calculating means is connected to the control means to receive a second set of pulses therefrom. The visual readout is connected to the calculating means to show continuously the mileage location of the vehicle along the highway.

More specifically, the equipment includes magnets attached to a rotating portion of the vehicle and a transducer located adjacent the magnets and attached to a fixed portion of the vehicle. The control means includes a capacitor connected to receive the said first series of pulses, and a variable resistor connected to the capacitor to regulate the rate that it charges in response to the said series of pulses. The control means includes means to emit one of the said second series of pulses and to discharge the capacitor each time the charge on the capacitor reaches a predetermined level. The control means also includes a SET switch to interrupt the flow of pulses on occasion, as well as an ADD and SUBTRACT mode switch.

BRIEF DESCRIPTION OF THE DRAWINGS

The character of the invention, however, may be best understood by reference to one of its structural forms, as illustrated by the accompanying drawings, in which:

FIG. 3 is an electrical schematic view showing the circuitry used in the invention.

DESCRIPTION OF THE PREFERRED EMBODIMENT

Figure 1:
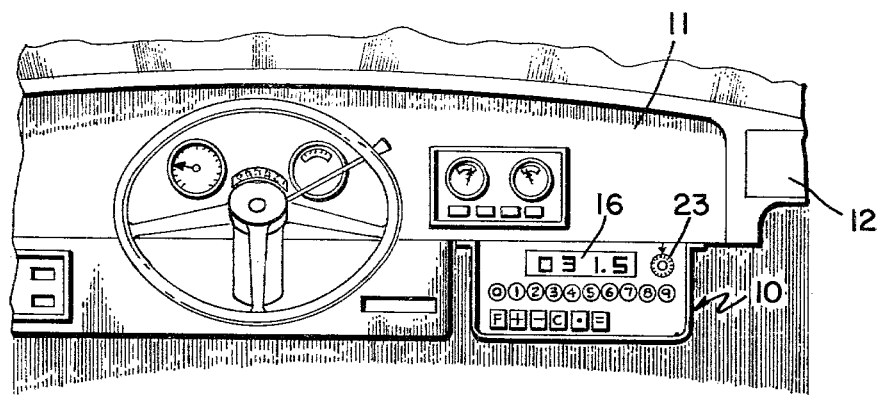
FIG. 1 is a front elevational view showing the odometer in use in an automobile.

Referring first to FIG. 1, wherein are best shown the general features of the invention, the odometer, indicated generally by the reference numeral 10, is shown in use in an automobile 11 having a dashboard 12. The odometer is fastened under the lower edge of the dashboard so that it is readily observable by the driver sitting behind the steering wheel.

Figure 2:
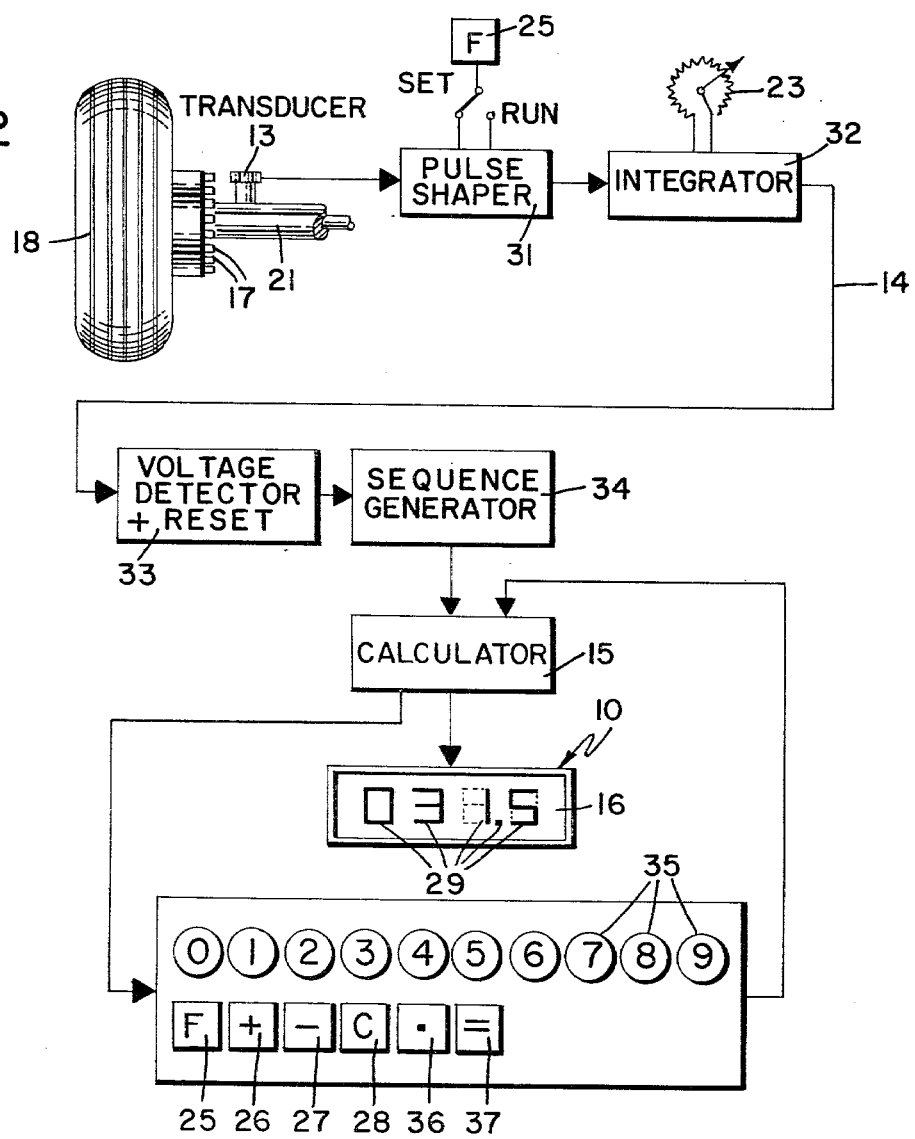
FIG. 2 is a somewhat schematic view of the odometer showing the various parts in place.

In FIG. 2 it can be seen that the odometer 10 is provided with a transducer 13 capable of generating a first series of electrical pulses indicative of the rate of travel of the vehicle. Connected to the transducer to receive the pulses is a control means 14. A calculating means 15 is connected to the control means to receive from it a second series of pulses. A visual readout 16 is connected to the calculator for giving a continuous readout of the highway mileage.

As is clearly shown in FIG. 2, the pickup in the preferred embodiment consists of a series of permanent magnets 17 arranged on a rotating portion of the wheel 18, as well as a transducer 13 arranged adjacent the magnets on a fixed part 21 of the vehicle.

Referring next to FIG. 3, it can be seen that the control means 14 is provided with a capacitor 22 for receiving a series of pulses from the transistor 20, which pulses arrive at a rate which is indicative of the rate of speed of the vehicle. Connected between the transistor 20 and the capacitor 22 is a variable resistor 23 which can be adjusted to change the rate at which the pulses serve to charge the capacitor which acts as an integrating element. Control means is provided with means to emit one pulse and to discharge the capacitor when the capacitor reaches a predetermined value of charge, as indicated by the voltage across it.

In both FIGS. 2 and 3, it can be seen that the control means 14 is provided with a SET switch 25 (which is labeled "F") which serves to interrupt and re-establish the flow of pulses to the capacitor on occasion. Also provided in the control means is an ADD mode switch 26 (identified by a + sign) and a SUBTRACT mode switch 27 (indicated by a − sign) and a ADD mode could also be called the "up" mode, while the SUBTRACT mode could be called the "down" mode. A CLEAR switch 28 (designated by C) is connected to the calculating means 15 to clear the memory register and to return the readout to zero. The pressing of the numbered buttons, including the decimal point button, will cause a given desired mileage to appear on the readout 16. Subsequent closing of the SET switch 25 will allow pulses from the transducer to enter the control means and eventually change the numerals in the readout.

As shown in FIG. 2, the control means, indicated generally by the reference numeral 14, can be broken down into portions indicated as a pulse shaper 31, 32, a voltage detector and reset 33, and a sequence generator 34.

In FIG. 3 it can be seen that the coil 19 is part of a 3020T element connected to a ground wire 38, a nine-volt line 39, and an intermediate voltage wire 41. It is connected to the pulse shaper 31 which includes a 555 integrated circuit. This, in turn, is connected to the SET switch 25 through the rate-adjusting resistor 23 to the capacitor 22. These elements are in turn connected to an amplifier that forms part of the integrator 32 whose output voltage is proportional to the voltage on the integrating capacitor 22. Connected across the capacitor 22 is a programmable unit junction transistor 20. When the output voltage of the amplifier of the integrator 32 reaches a certain value, the voltage detector 33 produces a negative-going output pulse. This pulse fires the transistor 20 which serves to discharge the capacitor 22. The voltage detector 33 is in the form of a 311 integrated circuit. The amplifier of the integrator 32 is in the form of a CA-3140 integrated circuit. The voltage detector 33 is in turn connected to two 556 integrated circuits which serve as the sequence generator 34. The outputs of the sequence generator are connected through suitable transistors and the switches 26, 27, 36, and 28 to the calculator 15, which in turn is connected to the light-emitting diodes of the readout 16.

The operation and advantages of the invention will now be readily understood in view of the above discussion. In order that the readout 16 always show the vehicle operator's location on the highway, he must, first of all, find out his position. He does this by observing a mileage marker. Irrespective of the condition of the readout 16, he presses the SET button 25 which interrupts the flow of pulses and stops the operation of the calculator and the readout. He then presses one of the buttons 26 and 27 indicating whether he is on the side of the highway in which the location markers are going "up", or whether he is on the side where they are going "down". Then, he strikes the button 28 which clears the readout and brings it down to a "zero" reading. He then punches in the numbers on the numbered keys 35, placing the decimal point 36 in its proper sequence and the number he has just punched in appears on the readout 16. At the moment that he passes the mileage marker that he has just entered in the memory, he then presses the SET button 25 (F) and this causes the apparatus to respond. From then on the readout 16 carries an accurate reading of the actual mileage at every point. He is then able to use this information to his advantage, as will be described more fully hereinafter.

The closing of the switch (F) and setting it in the "RUN" position causes pulses appearing on the output of the transducer 13, due to the passage of the permanent magnet 17 past it, to enter on the line 41. These are impressed on the pulse shaper 31 which serves to improve the shape of the pulses, so that they may be used more readily by the equipment which follows. The pulses pass through the switch 25, since it is in the "RUN" position and pass through the resistor 23 into the capacitor 22 and begin to charge that capacitor. When the charge on the capacitor, as indicated by the voltage across its leads, reaches a high enough value, its amplified output is transmitted to the voltage detector 33 to produce an output pulse which starts the sequence generator 34 and causes the actuation of the calculator 15 to add suitable numerals to the readout 16.

Since the location of the transducer 13, including the permanent magnets 17, may vary from one vehicle to another, it is necessary to calibrate the entire apparatus to fit the particular vehicle being used. The calibration can take place by use of the rate-adjusting resistor 23 and would be performed on a measured mile layout that is commonly found on highways. It could also be performed in connection with the ordinary highway markers when they are readily available and the driver is in a position to observe them carefully.

The advantages of the present invention have to do with its versatility, as contrasted with the use of the conventional mileage marker signs. Knowing exactly where one is presently located on a highway is important, because it permits the accurate location of road hazards, such as construction work, accidents, slippery spots, traffic tieups, and the like. Such information is most useful to public authority vehicles, such as fire trucks, police. It is also useful to motorists, particularly to motorists who have Citizen Band transceivers in their vehicles. Unfortunately, it is not always possible to read the mileage markers, because they may be covered with snow or soil or the like or because they have been knocked down or defaced. In addition, many markers are quite small and difficult to read. They require the vehicle operator to divert his vision from the highway, which activity is most undesirable. By use of the present invention, it is possible to display the location of the vehicle directly in front of the operator and it will continue to display the location of the vehicle without the continuous presence of the mileage marker signs. In other words, the vehicle operator can know his location even though he is located between mileage marker signs. It can be seen that adjustment is possible to compensate for the fact that different vehicles have different ratios between the transducer observed rotation and the actual distance traveled. Thus, the pulses are processed by the pulse-shaping circuitry to produce pulses which are identical so far as voltage, shape, and width are concerned, irrespective of the pulse frequency rate. These standard pulses are integrated by supplying them to a resistance-capacitance network. The number of pulses required to charge the capacitor to a given voltage will depend on the value of the series resistance. By using the variable resistor, the number of pulses required to change the capacitor voltage a given amount can be adjusted. This, of course, allows the device to be calibrated for the wide range of wheel diameters, tire wear, and drive train gear ratios that are encountered in the many types of vehicles in use today.

A very accurate voltage-measuring and detecting circuit measures the voltage on the integrator capacitor and, when this voltage reaches a preset value, it in turn produces an output pulse that is supplied to the sequence generator. In addition, when the voltage detector produces this output pulse, it also produces a signal to discharge the integrator capacitor allowing the process to repeat itself, as has been previously described.

By use of the present invention, therefore, the inventor has achieved a method of obtaining one pulse from a number of pulses generated by the transducer. Furthermore, it is possible to adjust the ratio of the number of pulses received at the transducer to the number of pulses produced at the output of the voltage detector. It is convenient, in the preferred embodiment, to adjust this ratio in such a way that one output pulse is produced by the voltage detector for each 1/10 of a mile (or kilometer) traveled by the vehicle. In one version of the invention, where six magnets were mounted on the vehicle wheel, 660 pulses from the transducer can bring about one pulse produced by the voltage detector for each 1/10 of a mile traveled. Once one has achieved a pulse for each one-tenth of a mile of travel, the information is, of course, suitably displayed, making use of a standard integrated circuit such as is employed in small electronic calculators, which circuit is readily available and inexpensive. When the operator set either switch 26 or 27 he knows, of course, which direction the mileage numbers are proceeding. North and East are usually PLUS directions and South and West usually MINUS directions. It should be noted that the sequence generator 34 acts on the calculator 15 in the same way as would be true if a human being were operating on the keyboard. In order to add a number manually, it would be possible to strike the + key, enter the decimal (.) key 36, enter the numeral "1" with one of the keys 35. In order to do this automatically, the sequence generator performs this operation electrically by use of four separate, spaced pulses for each pulse supplied by the voltage detector 33. These pulses are supplied to the calculator 15 and produce the same results that would be true if this information were manually entered by way of the keyboard. When changing from one highway system to another, the operator can depress the CLEAR button (C) and enter new data in the way that it has been described above.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Odometer for use with a vehicle, comprising: a pickup including a transducer for generating a first series of electrical pulses indicative of the rate of travel of the vehicle, the pickup including permanent magnets attached to a rotating part of the vehicle, said transducer being attached to non-rotating part of the vehicle adjacent the magnets, transmitting means for receiving said first series of pulses and for transmitting a second series of pulses indicative of the rate of travel of the vehicle in response to said first series, said transmitting means including a capacitor connected to receive said first series of pulses, a variable resistor connected to the capacitor to regulate the rate that the capacitor charges in response to said first series of pulses, and charge sensing means connected to the capacitor to generate a pulse of said second series each time a predetermined charge level is reached by the capacitor, calculating means with a memory and connected to the transmitting means to receive said second series of pulses, a set switch to interrupt the second series of pulses on occuasion, an ADD switch, a SUBTRACT switch, a visual readout, the readout being in the form of light emitting diodes, connected to the calculating means to show the mileage the vehicle has gone based on the second series of pulses, the mileage shown being adjustable by means of the ADD and SUBTRACT switches, a CLEAR switch to reduce the mileage stored in the memory and readout to ZERO and the numbered keys for setting a selected mileage in memory and introducing it to the calculating means and the readout simultaneously.

* * * * *